July 1, 1924.
E. SHAW
1,499,481
APPARATUS FOR THE TREATMENT OF FLUIDS
Original Filed Jan. 25, 1918    2 Sheets-Sheet 1
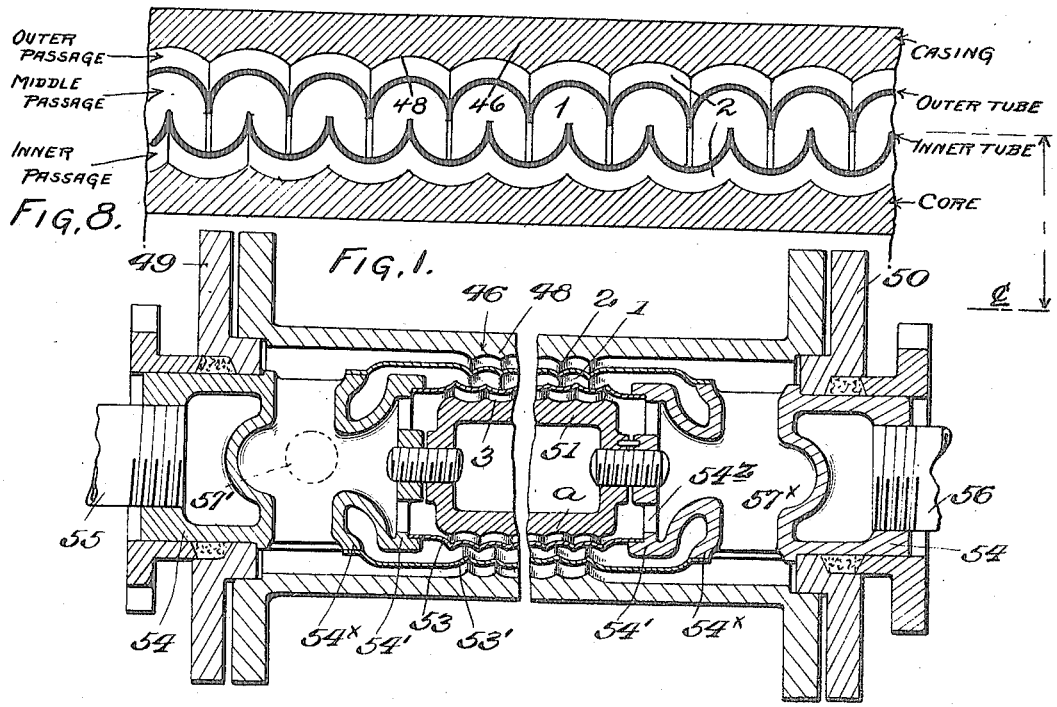
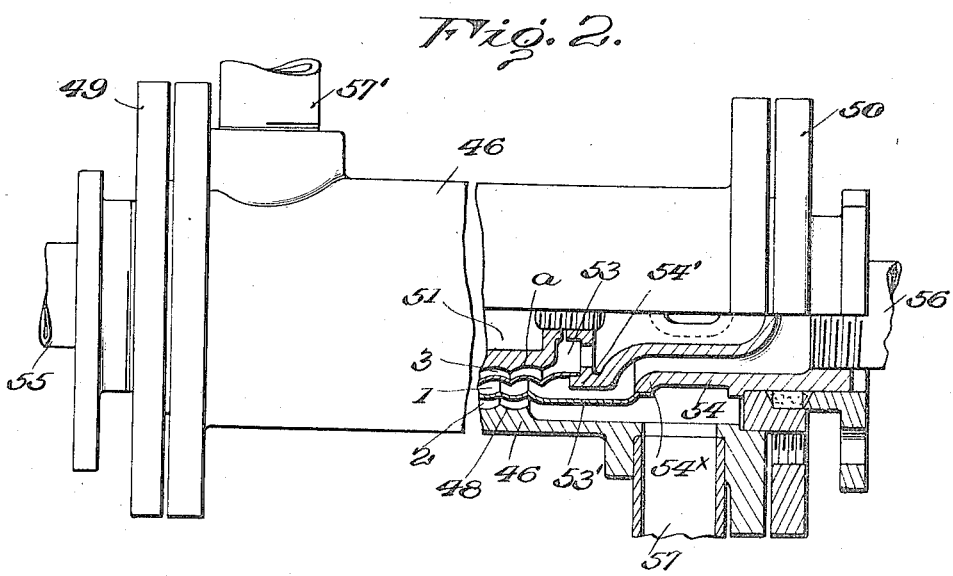
Inventor.
Edward Shaw.
by A. S. Cattison
his Attorney.

Inventor.
Edward Shaw.
by, A. S. Pattison
his Attorney.

Patented July 1, 1924.

1,499,481

UNITED STATES PATENT OFFICE.

EDWARD SHAW, OF TORONTO, ONTARIO, CANADA.

APPARATUS FOR THE TREATMENT OF FLUIDS.

Original application filed January 25, 1918, Serial No. 213,756. Divided and this application filed July 24, 1919. Serial No. 313,124.

*To all whom it may concern:*

Be it known that I, EDWARD SHAW, a subject of the King of Great Britain, residing in the city of Toronto, in the county of York, Province of Ontario, Canada, have invented certain new and useful Improvements in Apparatus for the Treatment of Fluids, of which the following is a specification.

This application is a division of my copending application No. 213,756.

This invention relates to heat exchange between a fluid flowing through a closed conduit and a fluid external to the conduit. In such conduits, investigation shows that films tend to form against the walls of the conduit, which films are very persistent and tend to flow slowly in stream lines along the surfaces. These films are to a large extent non-conductors of heat and greatly reduce the efficiency of any apparatus in which they are allowed to form and persist.

While it has been more or less vaguely realized that such films exist, it does not appear to have been recognized how extremely difficult it is to break them up nor what are the conditions which must exist in the apparatus to break them up. My experience goes to show that the desired results can only be attained by forcing the fluid at a high velocity through the conduit and subjecting it to abrupt and rapidly succeeding changes of direction of movement diagonally between opposite walls of the conduit and in planes substantially parallel to the length of the conduit, thereby preventing stream line flow of films in contact with said walls, and by constructing the apparatus with opposite walls so shaped, spaced and proportioned as to effect the desired changes of direction of movement and to present opposite wall surfaces along which it is impossible for any ordinary fluid to follow in a stream line flow.

Apparatus whereby my process may be put into effect is illustrated in the accompanying drawings in which—

Figure 3:
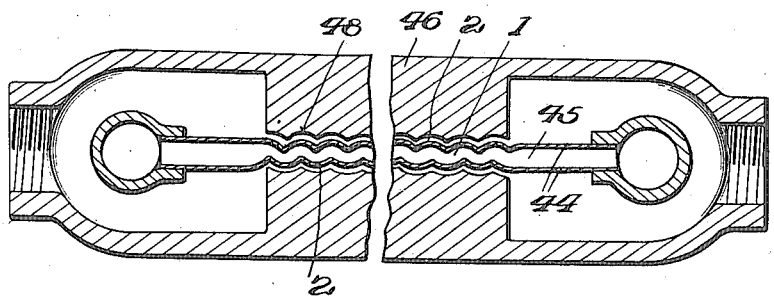
Figure 4:
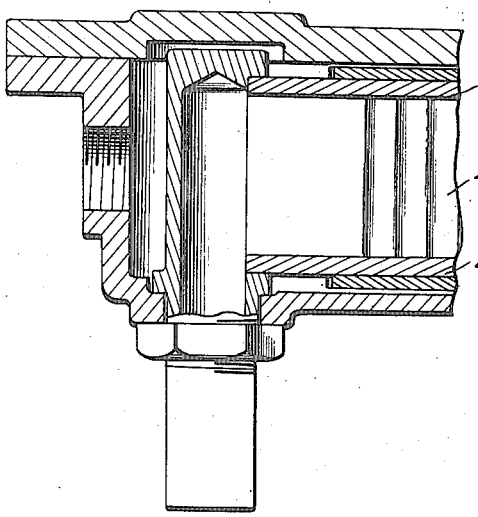
Figure 5:
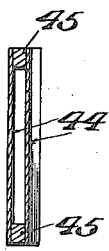
Figure 6:
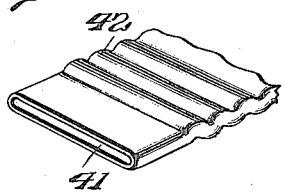
Figure 7:
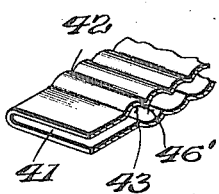

Fig. 1 is a longitudinal sectional view of a passage of an apparatus embodying my present invention;

Fig. 2 a partial longitudinal sectional view taken at right angles to Fig. 1;

Fig. 3 a longitudinal sectional view of one passage of an apparatus embodying my present improvement showing a modification in form;

Fig. 4 a longitudinal section of part of the modified apparatus taken at right angles to Fig. 3;

Fig. 5 a cross section of the conduit shown in Figs. 3 and 4;

Fig. 6 a detached perspective view, showing a portion of a flattened corrugated tube which embodies my invention; and Fig. 7 a perspective longitudinal section of the form of corrugated tube shown in Fig. 6.

Fig. 8 is an enlarged longitudinal sectional view of the corrugated portions of the tube.

In the drawings like numerals of reference indicate corresponding parts in the different figures.

In Figs. 1 and 2 I show a construction embodying my improvement, whereby the objects of my invention are efficiently obtained.

In these figures, 46 indicates an outer casing having annular corrugations 48, and provided with heads 49 and 50. An inner casing 51 is provided with annular corrugations $a$. Located between the inner and outer casings 46 and 51 is an inner corrugated cylinder 53 and an outer corrugated cylinder 53'. The members 54 are carried by the heads 49 and 50 and into these members the pipes 55 and 56 extend. The members 54 are hollow and each is provided with an annular portion $54^x$, to which the outer cylinder is secured, and an annular portion 54', to which the inner cylinder is secured. A fluid opening 57 and a fluid opening 57' are provided whereby a fluid may be circulated outside the conduit formed by the corrugated cylinders 53 and 53'. Diametric ducts $57^z$ extend through the members 54 and communicate with the interspace between the inner cylinder and the inner casing through the orifices $54^z$. By the means described, fluid may be circulated in either direction through the interspace between the outer casing and outer cylinder, and through the interspace between the inner casing and the inner cylinder, the space between the inner and outer cylinders being in communication with pipes 55 and 56.

From the foregoing description, it will be observed that there is a zigzag fluid passage or conduit 1 formed between the inner and outer corrugated cylinders 53 and 53'; a zigzag fluid passage 2 surrounding the outer corrugated cylinder 53' and a zigzag fluid passage 3 within the inner corrugated cylinder 53. The corrugations of the walls of the conduit 1, and preferably also those of the external passages, are so formed as to cause abrupt and rapidly succeeding changes of direction of movement of a fluid diagonally between opposite walls of the conduit when the fluid is passed through the conduit at high velocity.

The desired effect can best be attained if the salient bends of the corrugations within the conduit are so shaped that they form cusps or apices of a pronounced character, the corrugations between the cusps being concavely curved. Attention is called to the arrangement of the corrugations of the inner and outer cylinders 53 and 53', whereby the cusps or apices of the corrugations of one cylinder are approximately opposite the centers of the curves of the corrugations of the other cylinder. This forms a passageway or conduit which has transversely extending abrupt cusps or apices to perform a function already hinted at and hereafter more fully explained. The inner and outer cylinders 53 and 53' are of such relative diameters that the inner cylinder can be passed endwise through the outer cylinder to its proper fixed position.

The fluid being treated is passed through the central fluid passage 1, in one direction at a high velocity and under pressure, while the fluid passing through the inner and outer passages 2 and 3 preferably moves in the opposite direction and also at high velocity and under pressure. By reason of this form of passage or conduit, the moving fluid is rapidly and violently forced alternately against the opposite walls of the passage, which results in the breaking up of the films which tend to form against the walls of the conduit and interfere with the transfer of heat. This effect is apparently produced not only by the strong scouring action of the fluid when its direction of movement is abruptly changed, but also to the fact that a fluid flowing along the surface when it comes to the abrupt turn cannot make that turn, but is caught and broken up in the eddy which naturally forms behind the corrugation or projection which produces the change of direction of movement. As the fluid is being rapidly forced through one of my zigzag conduits, it is violently jolted and these jolts are repeated so rapidly that the fluid is subjected to a great many jolts within a seconds time. In this respect this system, therefore, differs from any system known to me and may be aptly termed the "jolt" system. By reason of this violent jolting of the fluid the inherent films of the moving fluid are torn away and broken up, and I find that my apparatus and method is highly efficient as compared with those systems heretofore known to me.

I find that the best results are attained by making the passages substantially as shown, and by arranging all the cusps of both walls in substantially longitudinal alinement with one another.

In Figs. 3, 4 and 5 I illustrate a modification, two suitably corrugated sheets of copper 44 being brazed to spacing strips 45 forming sides to the conduit. In this case I preferably arrange the outside fluid passages as indicated with the corrugations substantially paralleling the corrugations of the outer walls of the sheets 44, thereby obtaining a high scouring effect on the outside of the inner conduit.

This arrangement is also followed in the form of the invention shown in Figs. 1 and 2.

Thus, as regards the outside passages, it will be seen that a film tending to flow along the outer wall of the inner conduit tends to pile itself up at the points where the corrugations form re-entrant angles, while the general mass of fluid controlled in its direction of movement by the concave curve of the outer wall of the passage will impinge at these points on the piled up film and break up its stream line flow.

In Figs. 6 and 7 is shown a construction in which a copper tube 41, say 1¼ inches in diameter and $\frac{1}{16}$ of an inch in thickness, is flattened until it has a cross section of about 2 inches by ⅜ inch with rounded edges. I then corrugate the surface of the tube 41, as at 42, preferably by rolling a wheel across both the flat surfaces so that the outside surface of the tube now becomes ribbed with a succession of transverse convex ribs, the ribs being curved outside approximately on a radius of $\frac{1}{16}$ of an inch. The ribs on the opposite sides are alternately spaced, so that a zigzag passageway is formed in the tube by a series of semicylindrical grooves 43 extending the entire width of the tube on opposite sides thereof. In cross section these grooves are approximately semicircles of $\frac{1}{16}$ of an inch radius, meeting in more or less abrupt cusps.

The construction shown in all the drawings, it will be seen, is such as to subject a fluid flowing at high velocity to rapid and violent movements of a "jolt" character, thus violently breaking up the films of the flowing fluid which tend to form against the walls.

I have thus far referred to the apparatus and method as used for heat exchange between fluids. The method and apparatus, however, is not limited to that use, for I find that this "jolt" construction or system is very efficient in the removal of water from water gas-tar, which overcomes entirely certain grave difficulties which have caused trouble in gas-works, and may be used for any other purpose for which it is adapted.

When my apparatus is used for heat exchange, I have found it to be very efficient. For example, with apparatus as commonly employed I am not aware of a transfer of 1000 B. t. u.'s per square foot per hour per degree temperature difference having been obtained, whereas with my "jolt" tube apparatus, I have exceeded 3000 B. t. u.'s per hour under similar conditions.

What I claim as my invention is:—

1. Apparatus for the treatment of fluids for the purposes described comprising a conduit having opposite walls corrugated to form a zig-zag passageway, the sides of the salient bends of the corrugations of one wall within the conduit meeting at such an angle as to form acute apices, the salient bends of the corrugations of both walls being in substantially longitudinal alinement with one another.

2. Apparatus for the treatment of fluids for the purposes described comprising a conduit having opposite walls corrugated to form a zig-zag passageway, the salient bends of the corrugations of both walls, within the conduit, being in staggered relationship, shaped to form acute apices, and arranged in substantially longitudinal alinement with one another.

3. Apparatus for the treatment of fluids for the purpose described comprising a conduit having opposite walls corrugated to form a zig-zag passageway, the corrugations being shaped as a series of concave curves meeting in cusps.

4. Apparatus constructed as set forth in claim 3 in which the points of the cusps of the corrugations of each wall are in substantial alinement with one another.

In testimony whereof I hereunto affix my signature.

EDWARD SHAW.